United States Patent [19]
Gardner

[11] Patent Number: 5,929,413
[45] Date of Patent: *Jul. 27, 1999

[54] SELF-SERVICE TERMINAL (SST) AND METHOD OF OPERATING THE SST TO CONTROL MOVEMENT OF A CARD OF THE SST

[75] Inventor: John Gardner, Fife, United Kingdom

[73] Assignee: NCR Corporation, Dayton, Ohio

[ * ] Notice: This patent is subject to a terminal disclaimer.

[21] Appl. No.: 08/837,257

[22] Filed: Apr. 10, 1997

[30] Foreign Application Priority Data

Dec. 18, 1996 [GB] United Kingdom .................. 9626196

[51] Int. Cl.⁶ .................................................. G06F 17/60
[52] U.S. Cl. .......................................... 235/379; 235/381
[58] Field of Search ..................................... 235/375, 380, 235/379, 381, 382; 902/22, 26, 27

[56] References Cited

U.S. PATENT DOCUMENTS 5,253,167  10/1993  Yoshida et al. .............................. 902/6
5,386,104  1/1995  Sime ......................................... 235/379
5,397,886  3/1995  Mos et al. .................................. 235/475
5,861,614  1/1999  Gardner ..................................... 235/379

*Primary Examiner*—David P. Porta
*Assistant Examiner*—Drew A. Dunn
*Attorney, Agent, or Firm*—Michael Chan

[57] ABSTRACT

A self-service terminal in the form of an automated teller machine (ATM) comprises a card reader having a transport path and a card entry slot at one end of the transport path for receiving a user identification card from an ATM user to enable the ATM user to gain access to the ATM. A card resides in a position adjoining the card reader and is movable between a first position and a second position along the transport path. A transport mechanism moves the card between the first and second positions. A processor unit controls the transport mechanism to move the card between the first and second positions to detect the presence of a fraud tool device along the transport path. The presence of a fraud tool device along the transport path of the card reader is detected when the card is unable to be moved from one position to the other position. The card may be a cleaning card which cleans parts of the card reader as the card moves between the first and second positions.

20 Claims, 11 Drawing Sheets

5,929,413

SELF-SERVICE TERMINAL (SST) AND METHOD OF OPERATING THE SST TO CONTROL MOVEMENT OF A CARD OF THE SST

BACKGROUND OF THE INVENTION

The present invention relates to a self-service terminal, and is particularly directed to an automated teller machine (ATM) and a method of operating the ATM to detect the presence of a fraud tool device.

The use of a fraud tool device in a fraudulent scheme to steal a user identification card belonging to a legitimate ATM user is known. Typically, the person carrying out the fraudulent scheme inserts a fraud tool device into a card entry slot of a card reader of the ATM. The fraud tool device is then manipulated and positioned in the card entry slot so that a user identification card inserted by the next legitimate ATM user becomes jammed by the fraud tool device. Since the user identification card is jammed by the fraud tool device, the ATM user is unable to retrieve the card and eventually walks away from the ATM leaving the card behind. After the ATM user walks away from the ATM, the person carrying out the fraudulent scheme retrieves both the fraud tool device and the jammed user identification card. A number of known techniques have been applied in attempts to prevent a person from carrying out such a fraudulent scheme. A disadvantage in using the known techniques is that the presence of the fraud tool device is detected after a user identification card has been inserted into the ATM and jammed by the fraud tool device.

SUMMARY OF THE INVENTION

In accordance with one aspect of the present invention, a self-service terminal (SST) comprises a card reader having a transport path and a card entry slot at one end of the transport path for receiving a user identification card from an SST user to enable the SST user to gain access to the SST. A card resides in a position adjoining the card reader and is movable between a first position and a second position along the transport path of the card reader. A transport mechanism is provided for moving the card between the first and second positions. A processor unit is provided for controlling the transport mechanism to move the card between the first and second positions.

Preferably, the card is a fraud tool detection card (FTDC) having a size which is substantially identical to the size of a standard magnetic stripe card. The processor unit controls the transport mechanism to move the FIT)C between the first and second positions to detect the presence of a fraud tool device along the transport path of the card reader. More specifically, the presence of a fraud tool device along the transport path of the card reader is detected when the FTDC is unable to be moved from one position to the other position. Alternatively, the card may be a cleaning card having a size which is substantially identical to the size of a standard magnetic stripe card. The processor unit would control the transport to move the cleaning card between the first and second positions to clean parts of the card reader.

In accordance with another aspect of the present invention, an apparatus is provided for use with a card reader having a transport path along which a user identification card is movable. The apparatus comprises a card residing in a position adjoining the card reader and movable between a first position and second position along the transport path of the card reader. A transport mechanism is provided for moving the card between the first and second positions. A processor unit is provided for controlling the transport mechanism to move the card between the first and second positions.

In accordance with yet another aspect of the present invention, a method of operating a self-service terminal (SST) including a card reader having a transport path along which a user identification card is movable comprises the steps of (a) moving a card residing in a position adjoining the card reader between a first position and a second position along the transport path of the card reader, and (b) detecting the presence of a fraud tool device along the transport path of the card reader when the card is unable to be moved from one position to the other position. The presence of the fraud tool device along the transport path of the card reader is indicated after the presence of the fraud tool device has been detected in step (b). A user identification card is prevented from being introduced into the transport path of the card reader after the presence of the fraud tool device has been detected in step (b).

In accordance with still another aspect of the present invention, a method of operating a self-service terminal (SST) including a card reader having a transport path along which a user identification card is movable comprises the steps of (a) moving a card residing in a position adjoining the card reader between a first position and a second position along the transport path of the card reader, and (b) cleaning parts of the card reader when the card moves from one position to the other position.

DETAILS OF THE INVENTION

Figure 1:
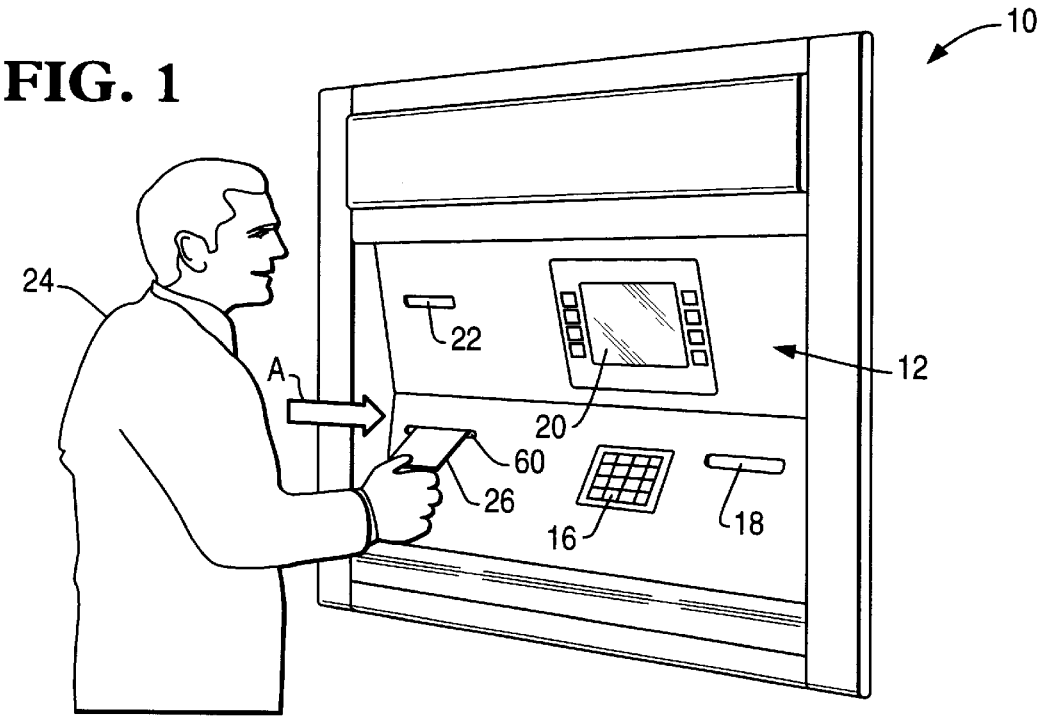
FIG. 1 is a perspective view of an automated teller machine (ATM) embodying the present invention.

The present invention is directed to a self-service terminal (SST) and a method of operating the SST to detect the presence of a fraud tool device. The specific construction of the SST may vary. An SST in the form of an automated teller machine (ATM) 10 embodying the present invention is illustrated in FIGS. 1 and 2.

The ATM 10 comprises a user interface in the form of a front panel 12. The front panel 12 includes a card reader 60, a key pad 16, a cash dispenser 18, a CRT display 20, and a receipt printer 22. As particularly shown in FIG. 1, the card reader 60 has a card entry slot through which a customer 24 can insert a user identification card 26 at the commencement of a transaction to be conducted by the customer. The cash dispenser 18 has a cash slot through which cash currency notes stored inside the ATM 10 can be delivered to the customer 24 during the transaction. The receipt printer 22 has a receipt slot through which a receipt of the transaction is delivered to the customer 24 at termination of the transaction.

When the customer 24 inserts the user identification card 26 into the card entry slot of the card reader 60, the card reader reads data contained on the card. The customer 24 is then prompted on the CRT display 20 to enter a personal identification number (PIN) via the key pad 16. After the correct PIN is entered, menus are displayed on the display 20 to enable the customer 24 to carry out the desired transaction. After the transaction is completed, the receipt printer 22 prints a receipt of the transaction and delivers the receipt through the slot of the receipt printer 22 to the customer 24.

Figure 2:
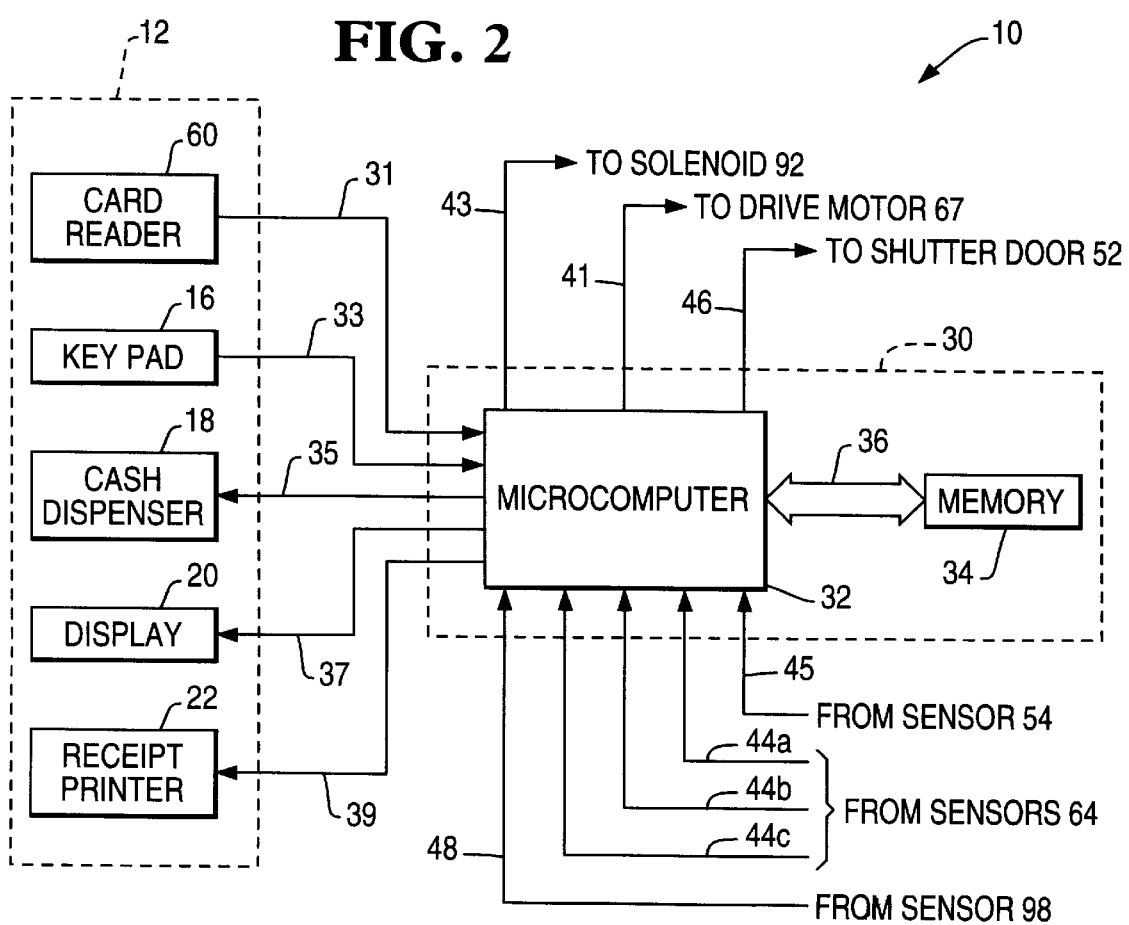
FIG. 2 is a block diagram representation of the ATM of FIG. 1.

Referring particularly to FIG. 2, the ATM 10 further comprises a controller unit 30 which communicates with components of the front panel 12. The controller unit 30 includes a microcomputer 32 and a memory 34 connected via bus line 36 to the microcomputer 32. The microcomputer 32 receives input signals on lines 31, 33 from the card reader 60 and the key pad 16, respectively, and provides output signals on lines 35, 37, 39 to the cash dispenser 18, the display 20, and the receipt printer 22, respectively, to control the amount of cash dispensed by the cash dispensed by the cash dispenser 18, the information displayed on the display 20, and the information printed by the receipt printer 22. The memory 34 may be non-volatile RAM. Suitable microcomputers and memories are readily available in the marketplace. Their structure and operation are well known and, therefore, will not be described.

Figure 3:
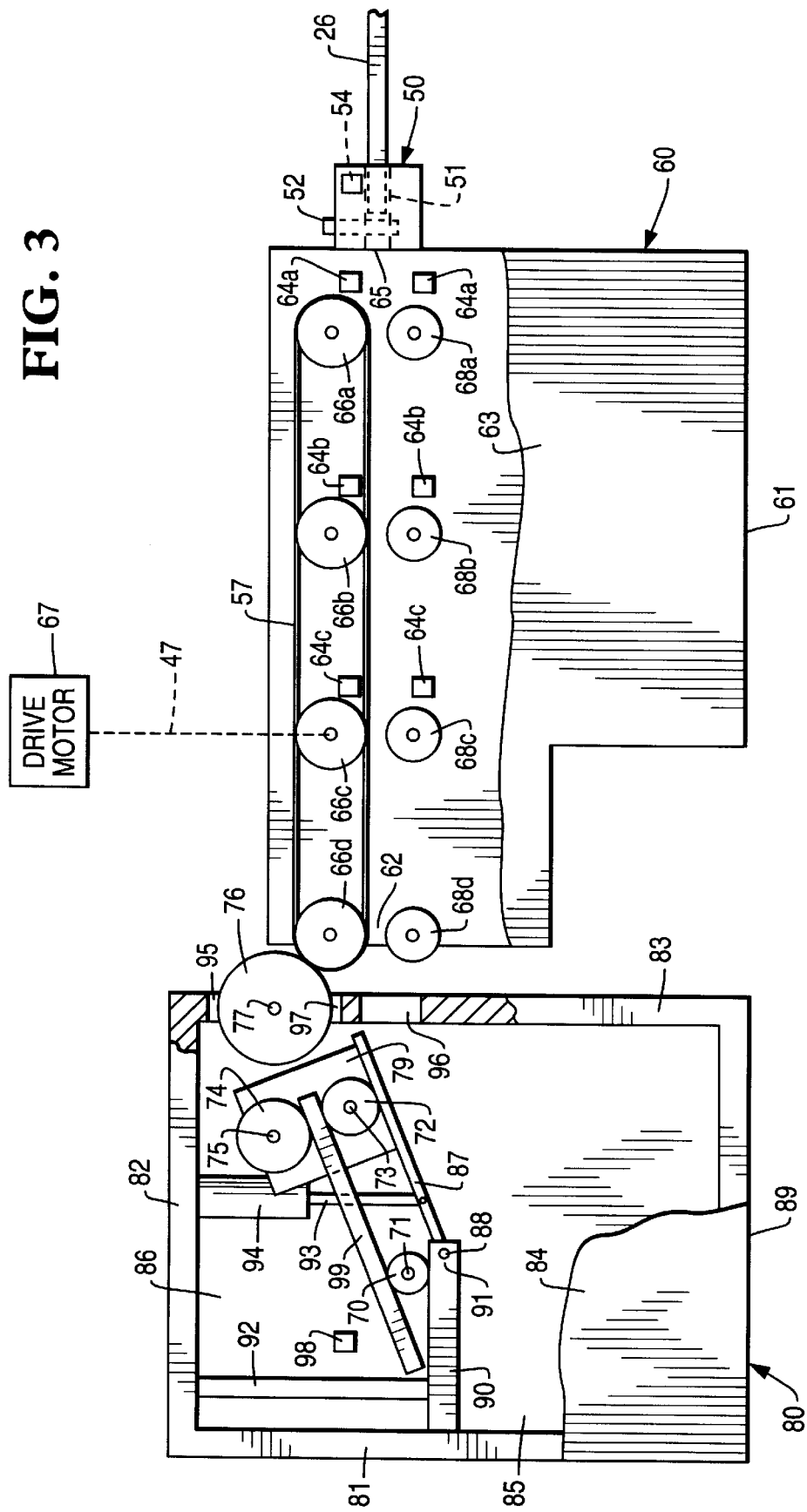
FIG. 3 is a view looking generally in the direction of arrow A of FIG. 1, with certain portions broken away and some parts shown only schematically.

Referring to FIG. 3, the card reader 60 comprises an enclosure 61 including a side wall portion 63 which is shown broken away in FIG. 3 to show details of a transport path 62 defined within the enclosure. The card entry slot of the card reader 60 is designated as reference numeral "65" in FIG. 3. The card entry slot 65 is disposed at one end of the transport path 62. The card reader 60 further includes a number of sensors 64a, 64b, 64c located along the transport path 62, a plurality of drive rollers 66a, 66b, 66c, 66d which are disposed on one side of the transport path, and a plurality of idler rollers 68a, 68b, 68c, 68d which are disposed on the other side of the transport path.

Preferably, each of the sensors 64a, 64b, 64c includes a light source located on one side of the transport path 62 and a light sensor facing the light source and located on the other side of the transport path. The sensors 64a, 64b, 64c are collectively referred to herein as "sensors 64". The drive rollers 66a, 66b, 66c, 66d are collectively referred to herein as "drive rollers 66". Similarly, the idler rollers 68a, 68b, 68c, 68d are collectively referred to herein as "idler rollers 68".

An endless belt 57 extends around the drive rollers 66, as shown in FIG. 3. The endless belt 57 defines the transport path 62. A drive motor 67 is operatively coupled (schematically shown as broken line 47 in FIG. 3) to the drive rollers 66 to rotate these rollers about their longitudinal central axes. The drive motor 67 is controlled by the microcomputer 32 via line 41 (shown only in FIG. 2). The microcomputer 32 monitors signals on line 44a, 44b, 44c (shown only in FIG. 2) from the sensors 64a, 64b, 64c, respectively, and controls operation of the drive motor 67 on line 41 in response thereto. The drive motor 67 drives the endless belt 57 to move a user identification card along the transport path 62 in a known manner.

A card capture bin 80 adjoins the card reader 60, as shown in FIG. 3. The capture bin 80 includes an enclosure 89 having a top wall portion 82 interconnecting opposite back and front wall portions 81, 83. A side wall portion 84 of the capture bin 80 is shown broken away to show details of the interior of the capture bin. A generally rectangular slot 96 is defined in the front wall portion 83. The slot 96 is aligned with the transport path 62 and has a size such that a user identification card is able to move from the transport path through the slot.

A shutter mechanism 50 is located in front of the card entry slot 65 of the card reader 60, as shown in FIG. 3. The shutter mechanism 50 has a shutter passage 51 which aligns with the card entry slot 65 such that the user identification card 26 inserted by the customer 24 is able to be moved through the shutter passage and the card entry slot into the transport path 62. The shutter mechanism 50 includes a shutter door 52 which is movable between a closed position which blocks the shutter passage 51 (as shown in FIG. 3) and an open position which unblocks the shutter passage (as shown in FIG. 4) to allow the user identification card 26 to move through the shutter passage into the transport path 62.

A sensor 54 is disposed along the shutter passage 51 and is located in a position which enables the user identification card 26 being inserted by the customer 24 to be detected. When the sensor 54 detects the presence of the leading edge of the user identification card 26 in the shutter passage 51 (as shown in FIG. 3), the sensor 54 provides an output signal on line 45 (shown only in FIG. 2) indicative thereof. The microcomputer 32 monitors the signal on line 45 and provides a control signal on line 46 to move the shutter door 52 from the closed position shown in FIG. 3 to the open position shown in FIG. 4 in response to the signal on line 45. The structure and operation of the shutter mechanism 50 including the shutter door 52 are known and, therefore, will not be described in detail.

Figure 4:
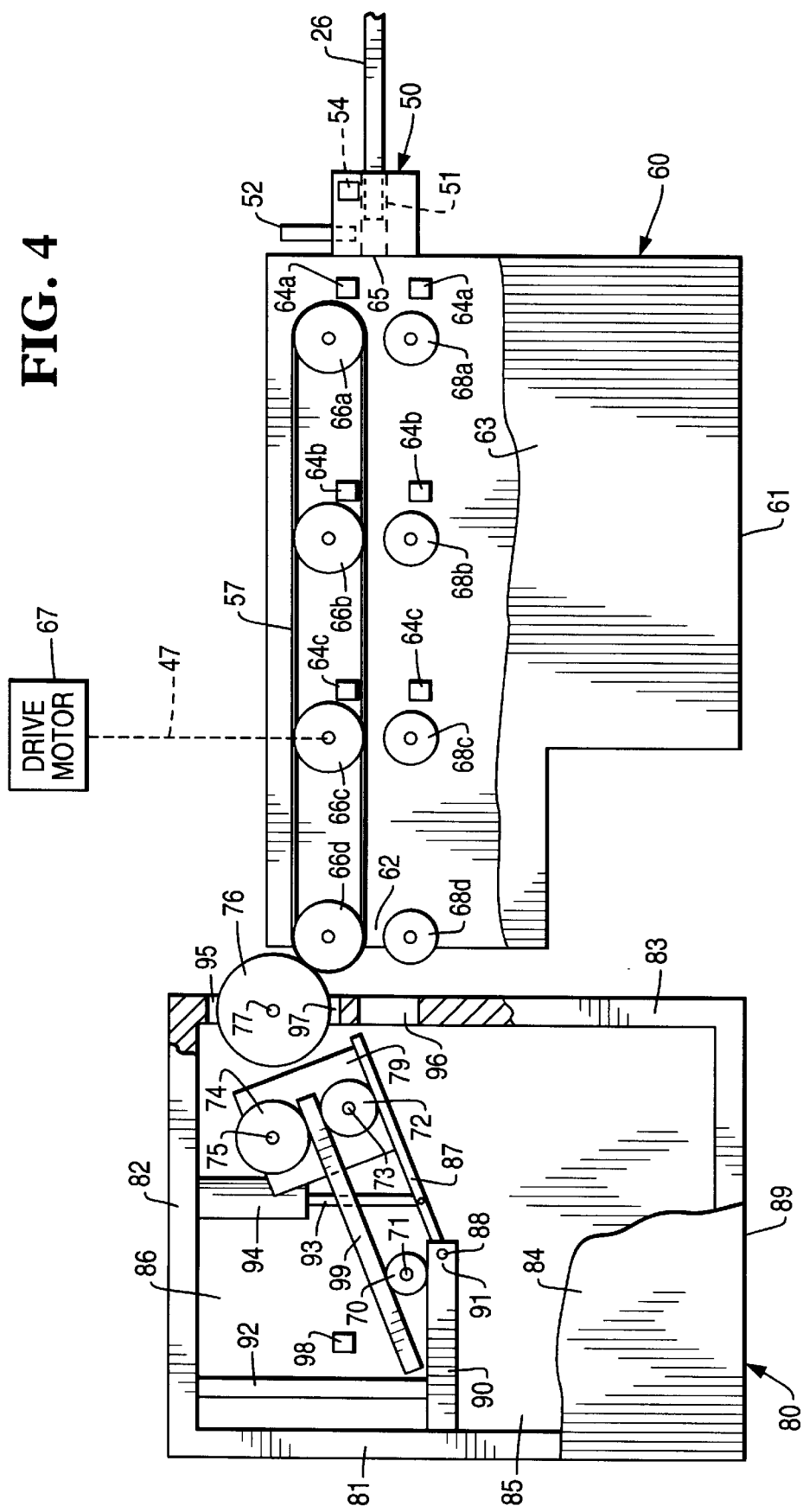
FIGS. 4–12 are views similar to FIG. 3 and showing parts in different positions.
Figure 5:
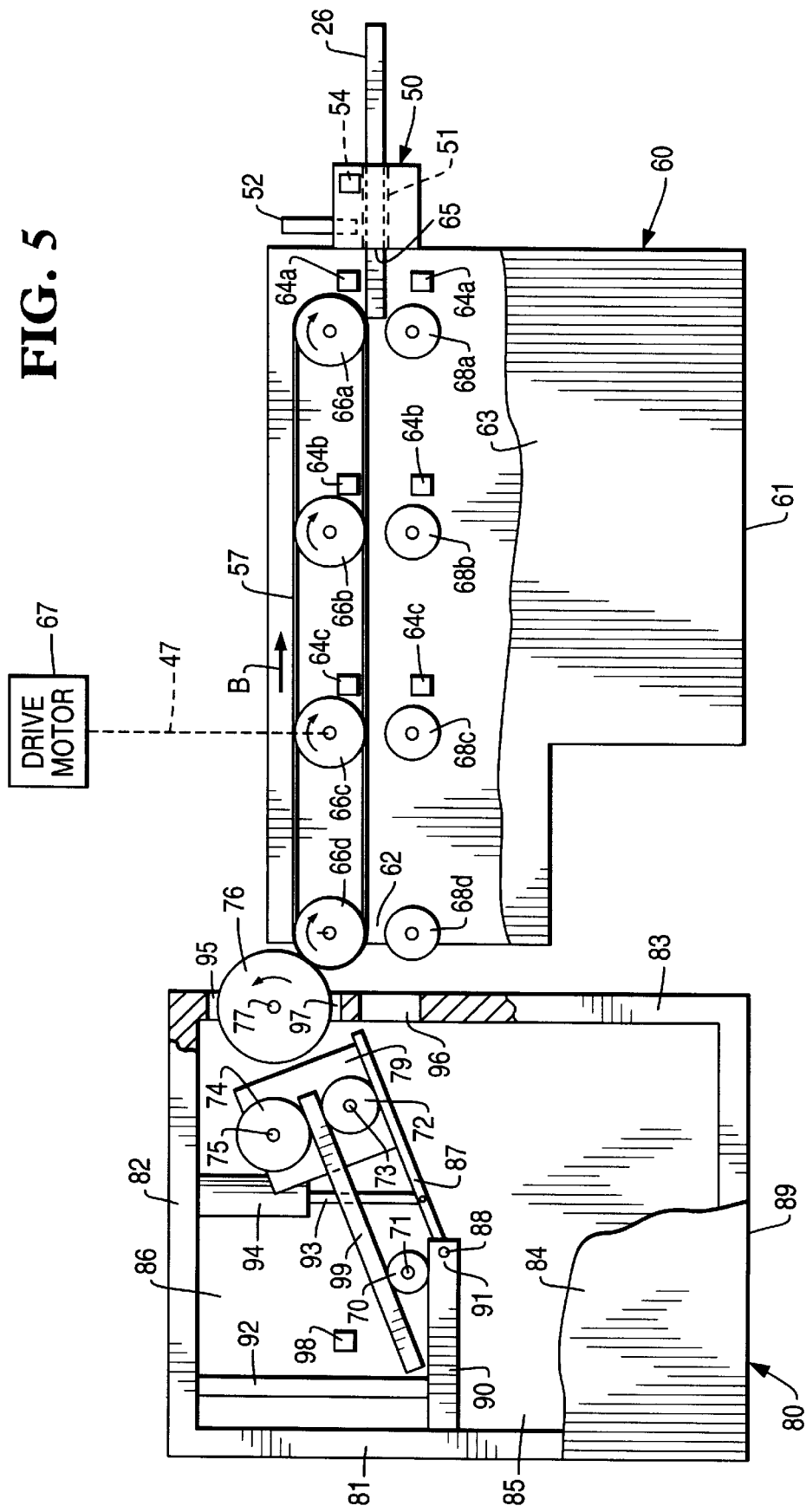

After the shutter door 52 has moved from the closed position shown in FIG. 3 to the open position shown in FIG. 4, the customer 24 is allowed to further insert the leading edge of the user identification card 26 from the position shown in FIG. 4 to the position shown in FIG. 5. In FIG. 5, the leading edge of the card 26 engages the outer circumferential surface of the endless belt 57.

When the user identification card 26 is in the position shown in FIG. 5, the first sensor 64a detects the leading edge of the card and provides a signal on line 44a (shown only in FIG. 2) indicative thereof. When this occurs, the microcomputer 32 produces a signal on line 41 to actuate the drive motor 67 to rotate the drive rollers 66 about their longitudinal central axes in a direction indicated by the arrows shown in the drive rollers 66 in FIG. 5. The rotation of the drive rollers 66 moves the endless belt 57 in the direction of arrow "B" shown in FIG. 5. Since the leading edge of the card 26 engages the outer circumferential surface of the endless belt 57, the movement of the endless belt in the direction of arrow "B" in FIG. 5 results in movement of the card from the position shown in FIG. 5 to the position shown in FIG. 6.

Figure 6:
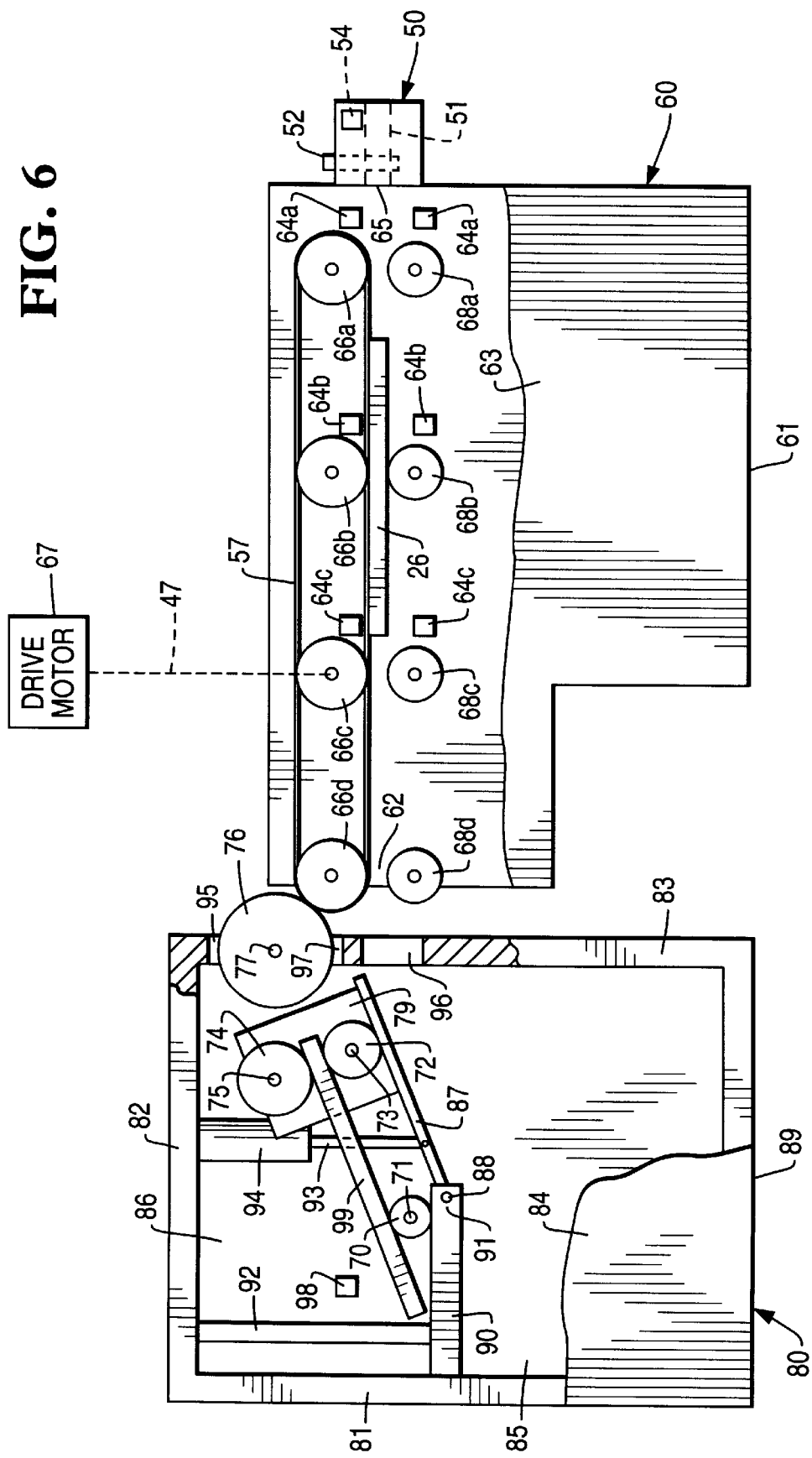

In FIG. 6, the leading edge of the card 26 is detected by the sensor 64c. When this occurs, the sensor 64c provides a signal on line 44c (FIG. 2) indicative thereof. In response to the signal on line 44c, the microcomputer 32 produces a signal on line 41 to turn the motor 67 off and a signal on line 52 to close the shutter door 52. While the card 26 is in the position shown in FIG. 6, the customer 24 is allowed to carry out the desired financial transaction. After completion of the financial transaction, the shutter door 52 is opened and the motor 67 is actuated to rotate in the opposite direction. This results in rotation of the drive rollers 66 in the opposite direction, as indicated by the arrows shown in the drive rollers 66 in FIG. 7. The rotation of the drive rollers 66 moves the endless belt 57 in the direction of arrow "C" shown in FIG. 7. This results in movement of the card 26 from the position shown in FIG. 6 to the position shown in FIG. 7. The card 26 is thereby returned to the customer 24.

Figure 7:
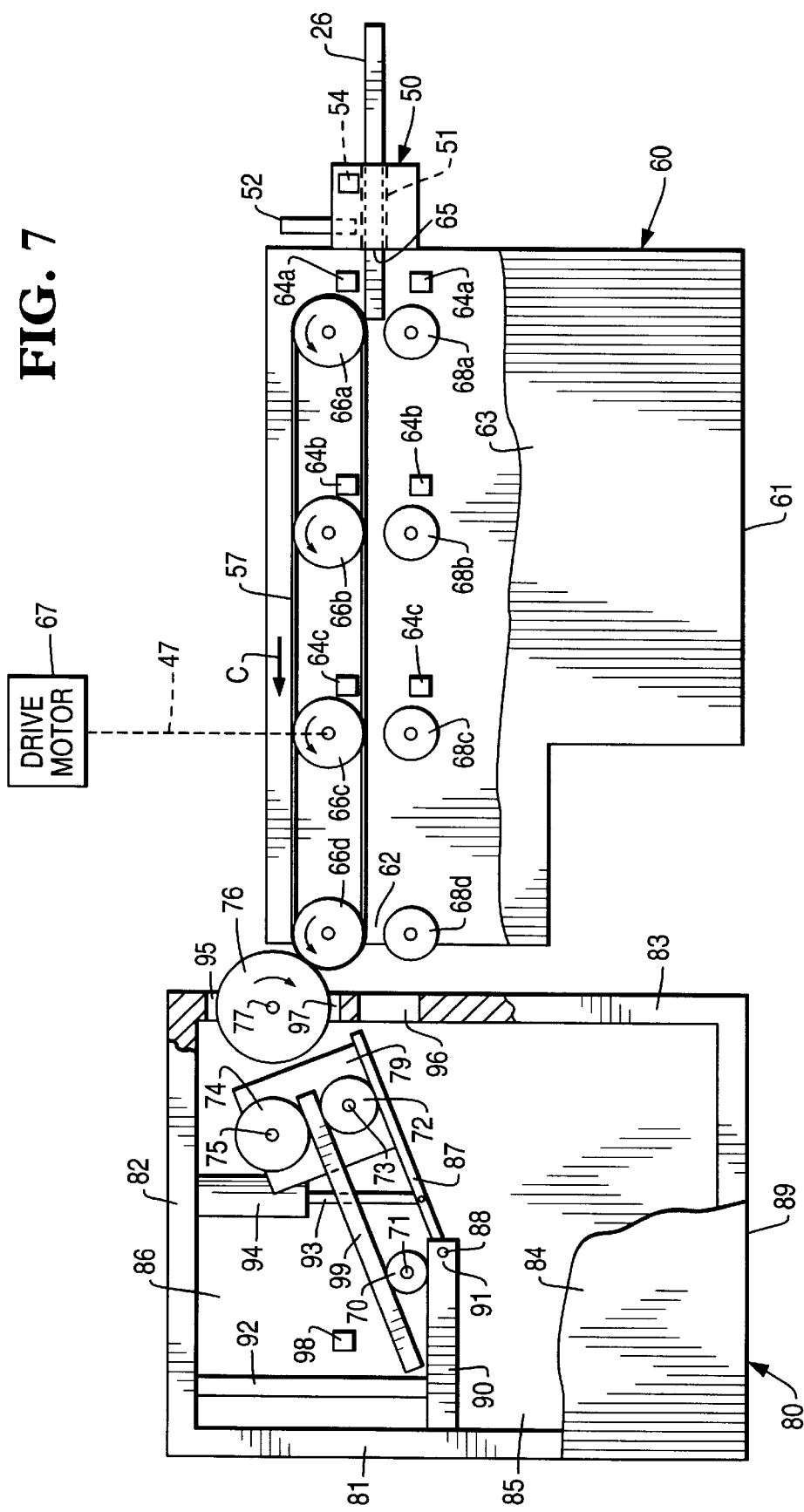
Figure 8:
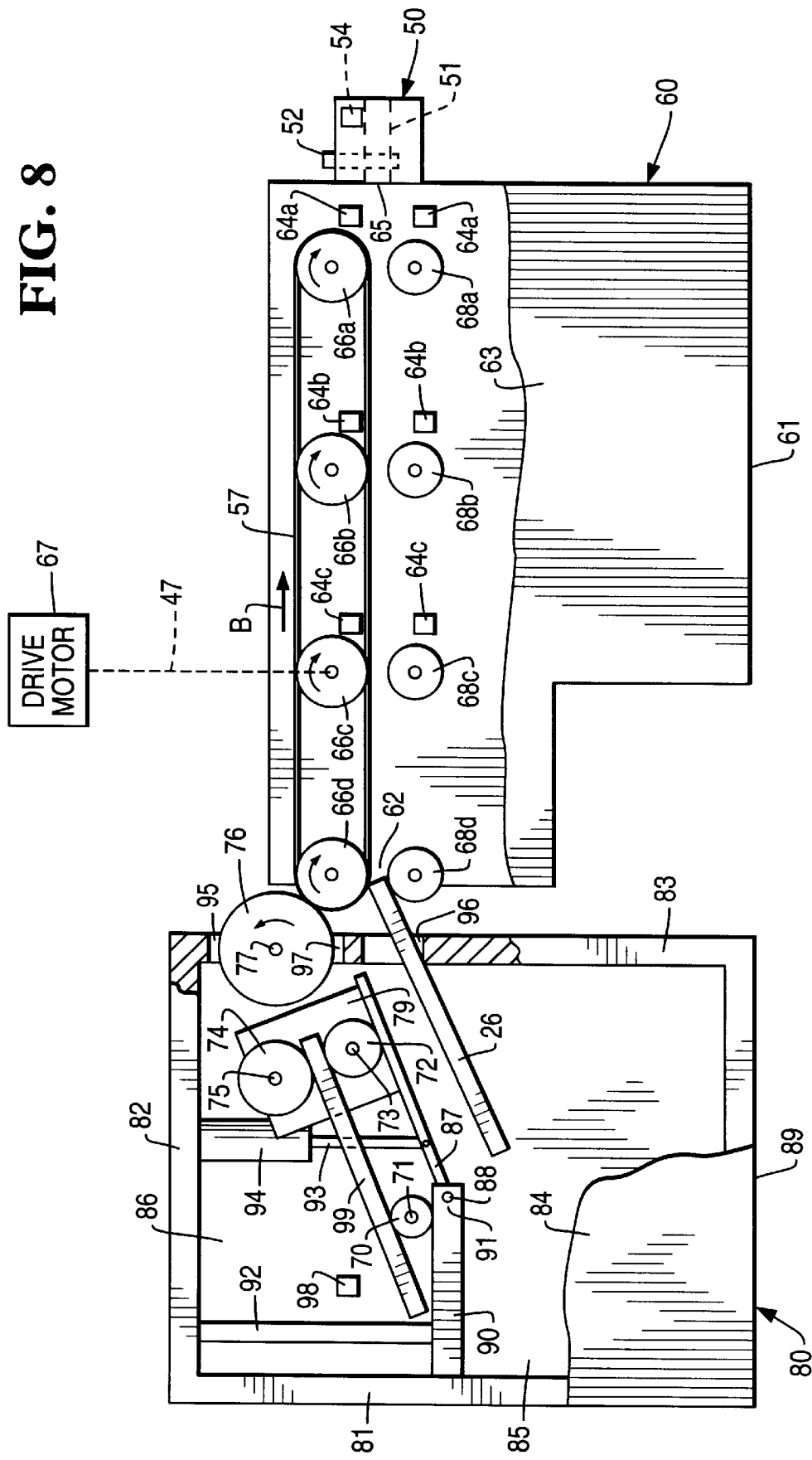

In the event that the customer 24 forgets to take the returned user identification card 26 shown in FIG. 7 and walks away from the ATM 10 after carrying out the financial transaction, the motor 67 is actuated to cause the card to move from the position shown in FIG. 7 to the position shown in FIG. 8. More specifically, the motor 67 is actuated to move the card 26 from the position shown in FIG. 7 to the position shown in FIG. 8 when the sensor 64a still detects the leading edge of the card 26 upon elapse of a predetermined amount of time since return of the card to the position shown in FIG. 7. Immediately after the card 26 moves from the position shown in FIG. 7 to the position shown in FIG. 8, the shutter door 52 closes as shown in FIG. 8.

Figure 9:
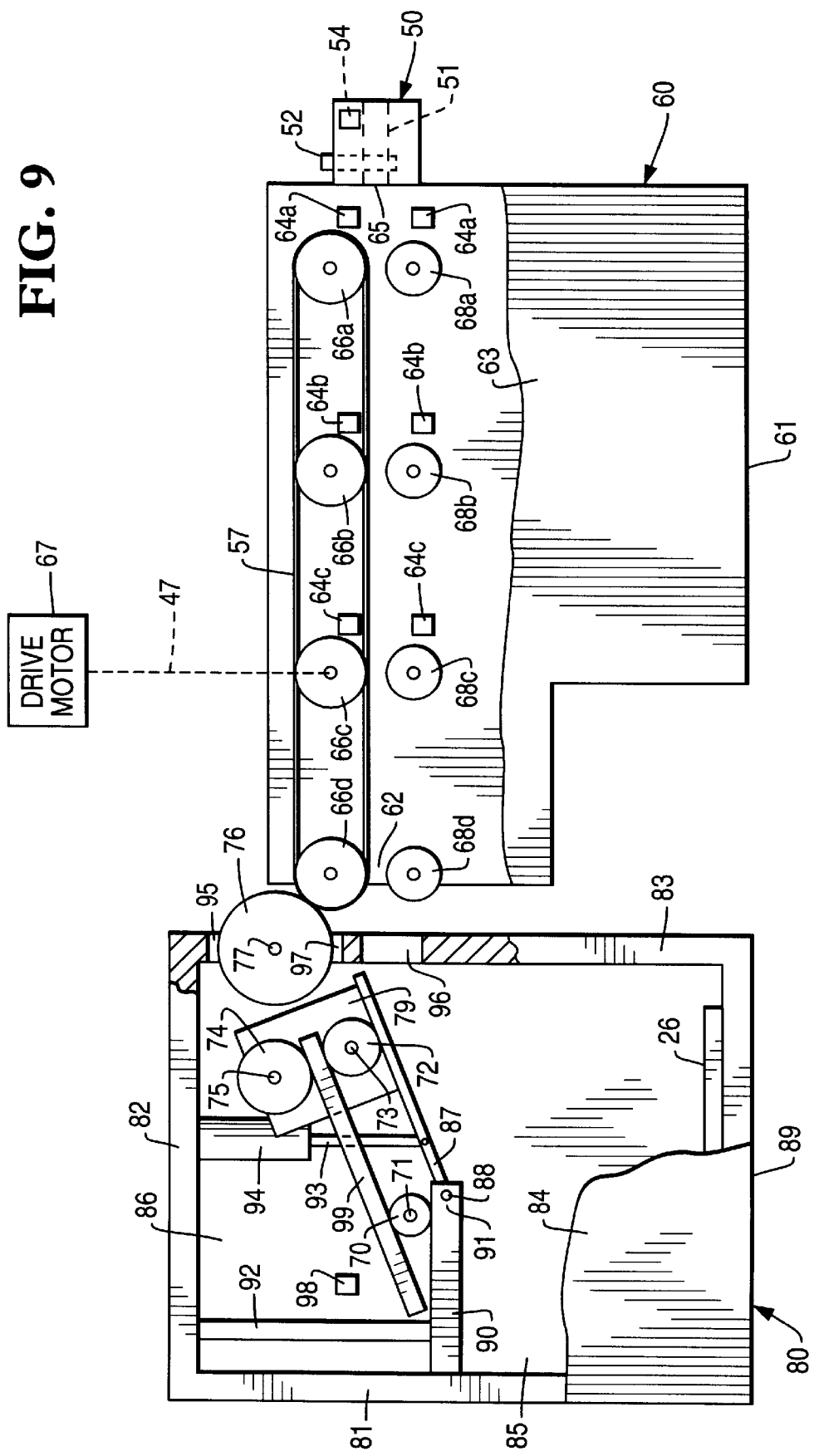

The card then drops from the position shown in FIG. 8 to the position shown in FIG. 9 inside the capture bin 80. The card 26 is thereby retained in the capture bin 80 to prevent a person who is not the card owner from taking the card. Shortly after the card 26 drops from the position shown in FIG. 8 to the position shown in FIG. 9, the first motor 67 turns off. This feature of retaining the card 26 after elapse of a predetermined amount of time is well known.

Figure 10:
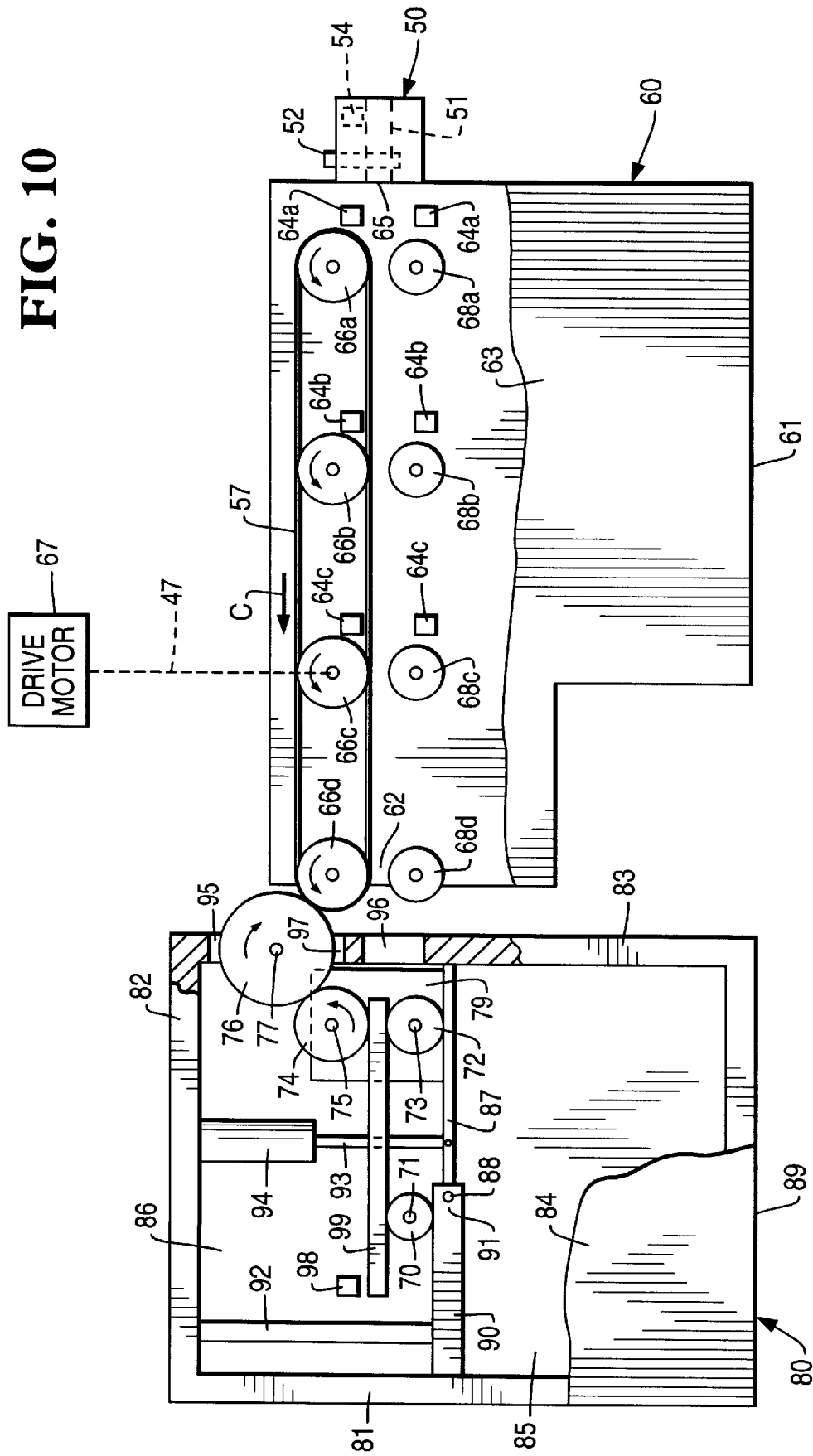

In accordance with the present invention, with specific reference to FIG. 7 in which the customer 24 has just completed a financial transaction, the capture bin 80 includes an inwardly extending wall portion 90 having one end thereof fixedly connected to the back wall portion 81. The inwardly extending wall portion 90 has an opposite free end 91 which extends inwardly to divide the space inside the capture bin into a lower compartment 85 and an upper compartment 86. A support piece 92 interconnects the top wall portion 82 and the inwardly extending wall portion 90 to support the inwardly extending wall portion. One end of a diverter flap 87 is pivotably connected via a pivot pin 88 to the free end 91 of the inwardly extending wall portion 90. The diverter flap 87 is pivotable between an open position as shown in FIG. 7 and a closed position as shown in FIG. 10.

An energizable solenoid 94 having a rod 93 connected to the armature (not shown) of the solenoid 94 is located in the upper compartment 86 and is fixedly mounted to the top wall portion 82. The solenoid 94 is mounted to the top wall portion 82 such that the rod 93 extends in a downward direction as viewed in FIG. 7. The rod 93 is connected to the diverter flap 87 in a manner as shown in FIG. 7 to move the diverter flap from the open position shown in FIG. 7 to the closed position shown in FIG. 10. The solenoid 94 is shown in FIG. 7 in a de-engergized condition, and is shown in FIG. 10 in an energized condition. The microcomputer 32 controls operation of the solenoid 94 in accordance with an application program stored in the memory unit 34 to control movement of the diverter flap 87 between the open position shown in FIG. 7 and the closed position shown in FIG. 10. The movement of the diverter flap 87 between the open position shown in FIG. 7 and the closed position shown in FIG. 10 will be described in detail later.

A first roller 70 is located in the upper compartment 86 and is rotatably mounted about its longitudinal central axis on a pivot pin 71 which is fixedly connected at one end to the side wall portion 84. A generally flat plate 79 is mounted on the diverter flap 87 and is movable together with the diverter flap. A second roller 72 is located in the upper compartment 86 and is rotatably mounted about its longitudinal central axis on a pivot pin 73 which is fixedly connected at one end to the flat plate 79. A third roller 74 is located in the upper compartment 86 and is rotatably mounted about its longitudinal central axis on a pivot pin 75 which is fixedly connected at one end to the flat plate 79.

A fourth roller 76 is located in a generally rectangular opening 95 defined in the front wall portion 83. The fourth roller 76 is rotatably mounted about its longitudinal central axis on a pivot pin 77 which is fixedly mounted between oppositely-facing interior edge surfaces 97 (only one of these edge surfaces 97 being shown in FIG. 7) defining the opening 95. The capture bin 80 is positioned relative to the card reader 60 such that the outer circumferential surface of the fourth roller 76 frictionally engages the outer circumferential surface of the first endless belt 57.

A fraud tool detect card (FTDC) 99 is located in the upper compartment 86. Preferably, the FTDC 99 has a size which is identical to the size of a standard magnetic stripe card. As shown in FIG. 7, one end of the FTDC 99 is frictionally engaged between the second and third rollers 72, 74. The other end of the FTDC 99 rests on the first roller 70. The FTDC 99 is shown in FIG. 7 in a resting position. A sensor 98 detects the presence of the FTDC 99 in its resting position and provides a signal on line 48 (shown only in FIG. 2) indicative thereof. The FTDC 99 is movable from the position shown in FIG. 7 to a position shown in FIG. 10. The FTDC 99 is shown in FIG. 10 in a testing position. The movement of the FTDC 99 between the position shown in FIG. 7 and the position shown in FIG. 10 is under control of an application program stored in the memory 34. The movement of the FTDC 99 between the position shown in FIG. 7 and the position shown in FIG. 10 is described in detail hereinbelow.

After completion of a financial transaction as just described hereinabove with reference to FIG. 7, the FTDC 99 is moved into the transport path 62 of the card reader 60 for the purpose of detecting the presence of any fraud tool which may have been forced into the transport path. More specifically, after the customer 24 has completed the desired financial transaction and has taken the returned card 26 shown in FIG. 7, the sensor 64a provides a signal on line 44a indicative thereof. When this occurs, the microcomputer 32 provides a signal on line 43 to energize the solenoid 94. When energized, the rod 93 connected to the armature of the solenoid 94 moves downward and thereby moves the diverter flap 87 from the open position shown in FIG. 7 to the closed position shown in FIG. 10. When the diverter flap 87 is in the position shown in FIG. 10, the outer circumferential surfaces of the third and fourth rollers 74, 76 frictionally engage each other.

The microcomputer 32 then produces a signal on line 41 to actuate the motor 6. The motor 67 is actuated such that the drive rollers 66 rotate in a direction indicated by the arrow shown in the drive rollers 66 in FIG. 10. This rotation, in turn, causes the third and fourth rollers 74, 76 to rotate in the directions indicated by the arrows shown in the third and fourth rollers 74, 76 in FIG. 10.

Figure 11:
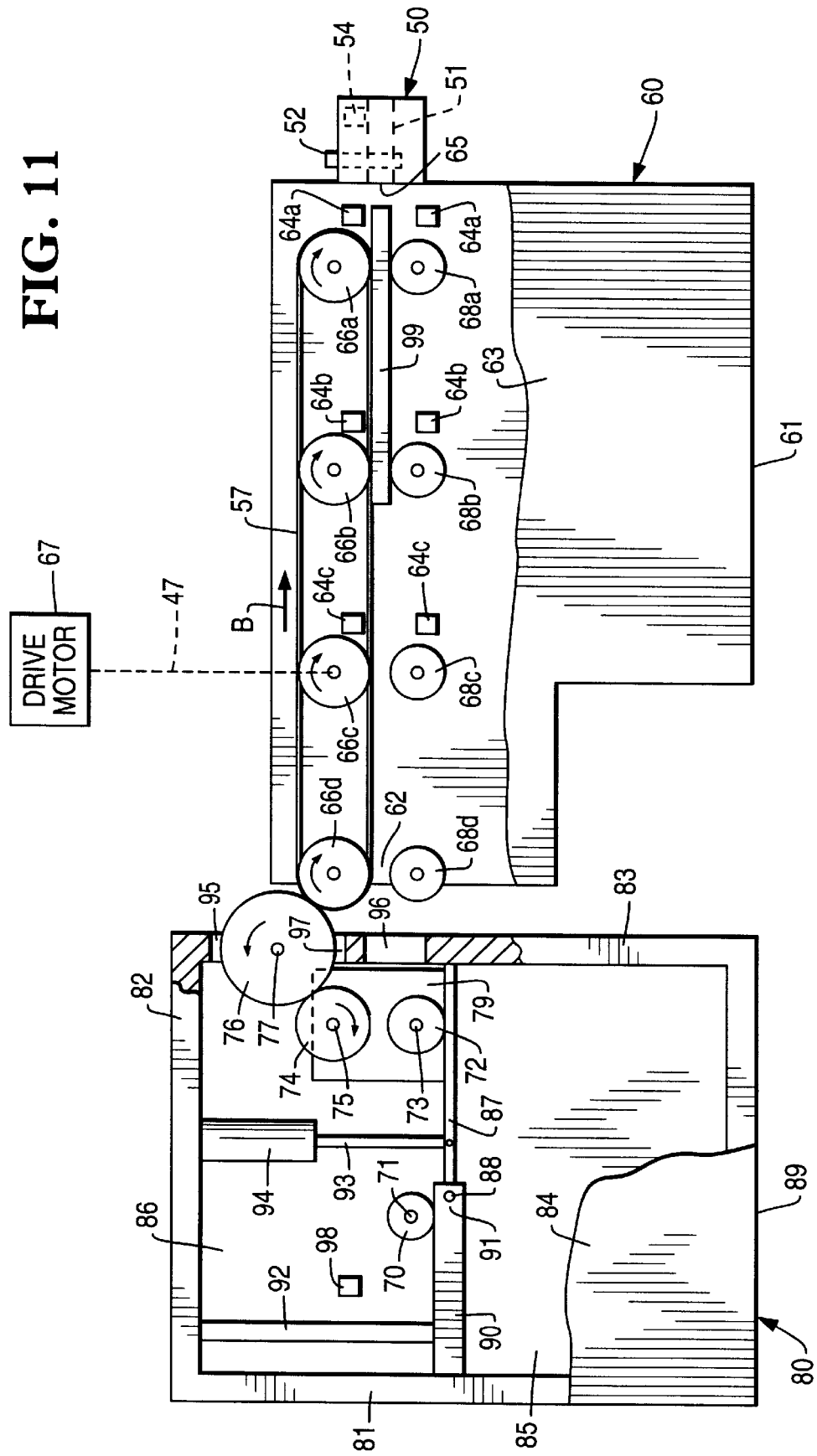

The rotation of the third and fourth rollers 74, 76 and the drive rollers 66, in the manner as just described, results in movement of the FTDC 99 from the position shown in FIG. 10 to the position shown in FIG. 11. In FIG. 11, the leading edge of the FTDC is detected by the sensor 64a. When the sensor 64a detects the leading edge of the FTDC 99, the sensor 64a provides a signal on line 44a indicative thereof.

Figure 12:
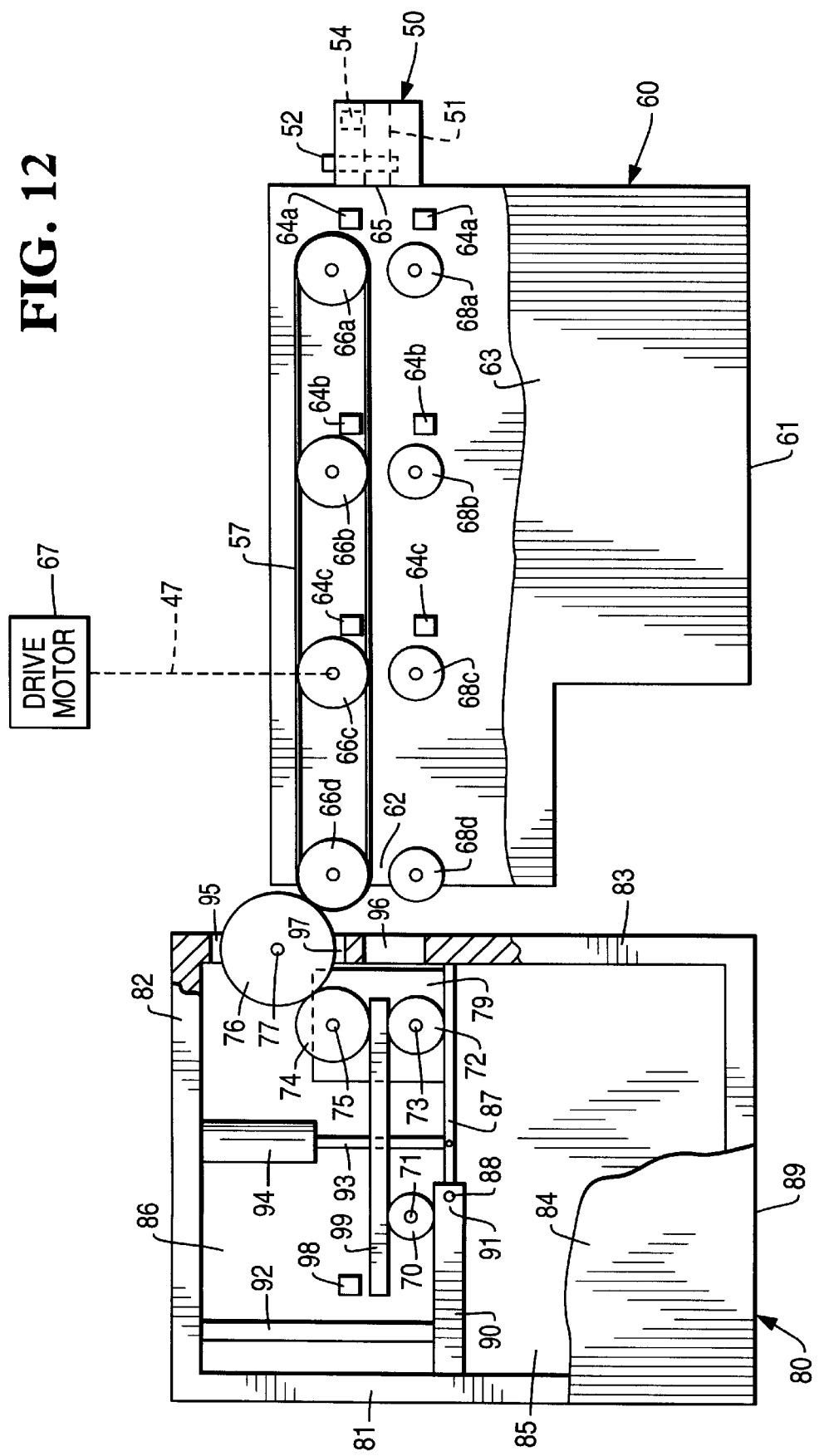

In response to the signal on line 44a, the microcomputer 32 provides a signal on line 41 to rotate the motor 67 in the opposite direction which, in turn, results in rotation of the drive rollers 66 in the direction of the arrows shown in the drive rollers 66 shown in FIG. 11. Also, the third and fourth rollers 74, 76 rotate in the directions indicated by the arrows shown in the third and fourth rollers 74, 76 in FIG. 11. This results in return movement of the FTDC 99 from the position shown in FIG. 11 to the position shown in FIG. 12. The return of the FTDC 99 back to the position shown in FIG. 12 is detected by the sensor 98 which provides a signal on line 48 indicative thereof. In response to the signal on line 48, the microcomputer 32 provides a signal on line 41 to turn off the motor 67 off.

When the FTDC 99 is able to complete the entire movement from the position shown in FIG. 10 to the position shown in FIG. 11 and then back to the position shown in FIG. 12, as just described hereinabove, the microcomputer 32 determines that the transport path 62 is clear and ready to accept a user identification card from the next customer. The ATM 10 is enabled and ready to process the next financial transaction.

However, if the FFDC 99 is unable to move completely from the position shown in FIG. 10 to the position shown in FIG. 11 and then return completely from the position shown in FIG. 11 to the position shown in FIG. 12, then the microcomputer 32 determines that the transport path 62 is not clear and that a fraud tool device may be present in the transport path. Upon this determination, the microcomputer 32 provides a signal on line 46 to disable the shutter door 52 as well as other signals required to disable the ATM 10 and prevent further use of the ATM. When disabled, the shutter door 52 is maintained in its closed position to prevent a user identification card from being inserted into the transport path 62. This prevents a user identification card from being inserted and jammed in the transport path 62 if a fraud tool is present in the transport path.

Although the foregoing describes movement of the FTDC 99 into the transport path 62 after completion of each financial transaction, it is possible that movement of the FTDC into the transport path could be effected before each financial transaction. For example, the FTDC 99 could be moved from its resting position to its testing position and then back to its resting position upon the sensor 64a detecting the presence of a user identification card. The shutter door 52 would not open until the microcomputer 32 has determined that the FTDC 99 has successfully moved from the resting position shown in FIG. 10 to the testing position shown in FIG. 11 and then back to the resting position shown in FIG. 12.

It is contemplated that the FRDC 99 may be a cleaning type of card. Cards of the cleaning type are known and commercially available. If the FTDC 99 is of the cleaning type, parts of the card reader 60 are cleaned upon each complete movement of the FRDC from its resting position to its testing position and then back to its resting position. Also, if the FTDC 99 is of the cleaning type, it may be preferable to move to move the FTDC only after a predetermined number of transactions has been carried out at the ATM, or only after a predetermined amount of time has elapsed since the last movement of the FTDC from its resting position to its testing position and then back to its resting position. This is to avoid unnecessary wear and tear on parts of the card reader 60 due to excessive cleaning. It is also conceivable that a card may be provided only for the purpose of cleaning parts of the card reader 60 and not at all for the purpose of detecting a fraud tool device along the transport path of the card reader.

A number of advantages result by providing an ATM and a method of operating the ATM in accordance with the present invention. One advantage is that the presence of a fraud tool device is detected before a user identification card is inserted into the card reader 60. Jamming of a user identification card by the fraud tool device is avoided. Another advantage is that ATMs currently in the field can be easily retrofitted at relatively low cost with features of the present invention. Still another advantage is that parts of the card reader 60 can be self-cleaned either periodically or after a predetermined number of transactions has occurred at the ATM.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A self-service terminal (SST) comprising:
   a card reader having a transport path and a card entry slot at one end of the transport path for receiving a user identification card from an SST user to enable the SST user to gain access to the SST;
   a card residing in a position adjoining the card reader and movable between a first position and a second position along the transport path of the card reader;
   a transport mechanism for moving the card between the first and second positions; and
   a processor unit for controlling the transport mechanism to move the card between the first and second positions.

2. An SST according to claim 1, wherein the card is a cleaning card having a size which is substantially identical to the size of a standard magnetic stripe card, the processor unit controlling the transport mechanism to move the cleaning card between the first and second positions to clean parts of the card reader.

3. An apparatus for use with a card reader having a transport path along which a user identification card is movable, the apparatus comprising:
   a card residing in a position adjoining the card reader and movable between a first position and second position along the transport path of the card reader;
   a transport mechanism for moving the card between the first and second positions; and
   a processor unit for controlling the transport mechanism to move the card between the first and second positions.

4. An apparatus according to claim 3, wherein the card is a cleaning card having a size which is substantially identical to the size of a standard magnetic stripe card, the processor unit controlling the transport mechanism to move the cleaning card between the first and second positions to clean parts of the card reader.

5. An apparatus according to claim 3, further comprising a card capture bin having a first portion which defines at least in part a compartment in which the card is stored when the card is in the first position.

6. An apparatus according to claim 5, wherein the card capture bin has a second portion which defines at least in part a card entry opening through which the card passes when the card moves between the first and second positions.

7. A method of operating a self-service terminal (SST) including a card reader having a transport path along which a user identification card is movable, the method comprising the steps of:
   (a) moving a card residing in a position adjoining the card reader between a first position and a second position along the transport path of the card reader; and
   (b) detecting the presence of a fraud tool device along the transport path of the card reader when the card is unable to be moved from the first position to the second position.

8. A method according to claim 7, further comprising the step of:
   (c) indicating the presence of the fraud tool device along the transport path of the card reader after the presence of the fraud tool device has been detected in step (b).

9. A method according to claim 7, further comprising the step of:
(c) preventing a user identification card from being introduced into the transport path of the card reader after the presence of the fraud tool device has been detected in step (b).

10. A method according to claim 7, further comprising the step of:
(c) cleaning parts of the card reader when the card moves from one position to the other position.

11. A method of operating a self-service terminal (SST) including a card reader having a transport path along which a user identification card is movable, the method comprising the steps of:
(a) moving a card residing in a position adjoining the card reader between a first position and a second position along the transport path of the card reader; and
(b) cleaning parts of the card reader when the card moves from one position to the other position.

12. A self-service terminal (SST) comprising:
a card reader having a transport path and a card entry slot at one end of the transport path for receiving a user identification card from an SST user to enable the SST user to gain access to the SST;
a card residing in a position adjoining the card reader and movable between a first position and a second position along the transport path of the card reader;
a transport mechanism for moving the card between the first and second positions; and
a processor unit for controlling the transport mechanism to move the card between the first and second positions;
the card being a fraud tool detection card (FTDC) having a size which is substantially identical to the size of a standard magnetic stripe card, the processor unit controlling the transport mechanism to move the FTDC between the first and second positions to detect the presence of a fraud tool device along the transport path of the card reader;
the card reader including a number of sensors located along the transport path for detecting the presence of either a user identification card or the FTDC along the transport path.

13. An SST according to claim 12, wherein each sensor includes a light source located on one side of the transport path and a light sensor facing the light source and located on the other side of the transport path.

14. A self-service terminal (SST) comprising:
a card reader having a transport path and a card entry slot at one end of the transport path for receiving a user identification card from an SST user to enable the SST user to gain access to the SST;
a card residing in a position adjoining the card reader and movable between a first position and a second position along the transport path of the card reader;
a transport mechanism for moving the card between the first and second positions; and
a processor unit for controlling the transport mechanism to move the card between the first and second positions;
the card being a fraud tool detection card (FTDC) having a size which is substantially identical to the size of a standard magnetic stripe card, the processor unit controlling the transport mechanism to move the FTDC between the first and second positions to detect the presence of a fraud tool device along the transport path of the card reader.

15. An SST according to claim 14, wherein the presence of a fraud tool device along the transport path of the card reader is detected when the FTDC is unable to be moved from one position to the other position.

16. A self-service terminal (SST) comprising:
a card reader having a transport path and a card entry slot at one end of the transport path for receiving a user identification card from an SST user to enable the SST user to gain access to the SST;
a card residing in a position adjoining the card reader and movable between a first position and a second position along the transport path of the card reader;
a transport mechanism for moving the card between the first and second positions; and
a processor unit for controlling the transport mechanism to move the card between the first and second positions;
the card reader including a transport mechanism for moving a user identification card along the transport path when the SST user inserts the user identification card into the card entry slot of the card reader, the transport mechanisms cooperating to detect the presence of a fraud tool device along the transport path of the card reader.

17. An apparatus for use with a card reader having a transport path along which a user identification card is movable, the apparatus comprising:
a card residing in a position adjoining the card reader and movable between a first position and second position along the transport path of the card reader;
a transport mechanism for moving the card between the first and second positions; and
a processor unit for controlling the transport mechanism to move the card between the first and second positions;
the card being a fraud tool detection card (FTDC) having a size which is substantially identical to the size of a standard magnetic stripe card, the processor unit controlling the transport mechanism to move the FTDC between the first and second positions to detect the presence of a fraud tool device along the transport path of the card reader.

18. An apparatus according to claim 17, wherein the presence of a fraud tool device along the transport path of the card reader is detected when the FTDC is unable to be moved from one position to the other position.

19. A method of operating a self-service terminal (SST) including a card reader having a transport path along which a user identification card is movable, the method comprising the steps of:
(a) moving a card residing in a position adjoining the card reader between a first position and a second position along the transport path of the card reader;
(b) cleaning parts of the card reader when the card moves from one position to the other position; and
(c) detecting the presence of a fraud tool device along the transport path of the card reader when the card is unable to be moved from one position to the other position.

20. A method according to claim 19, further comprising the step of:
(d) indicating the presence of the fraud tool device along the transport path of the card reader after the presence of the fraud tool device has been detected in step (c).

* * * * *